Aug. 12, 1952 C. H. HOEPPNER 2,607,006

BINARY DECODING SYSTEM

Filed March 22, 1950 2 SHEETS—SHEET 1

INVENTOR
CONRAD H. HOEPPNER
BY
ATTORNEY

BINARY DECODING SYSTEM

Filed March 22, 1950 2 SHEETS—SHEET 2

INVENTOR
CONRAD H. HOEPPNER
BY [signature]
ATTORNEY

Patented Aug. 12, 1952

2,607,006

UNITED STATES PATENT OFFICE 2,607,006

BINARY DECODING SYSTEM

Conrad H. Hoeppner, Waltham, Mass., assignor to Raytheon Manufacturing Company, Newton, Mass., a corporation of Delaware Application March 22, 1950, Serial No. 151,132

10 Claims. (Cl. 250—27)

This invention relates to conversion of binary coded numbers to pulse position or pulse time intelligence.

In many instances, it becomes desirable to convert binary coded numbers to pulse time or pulse position intelligence. For example, when information has been converted to binary code, as to take advantage of transmission or storage in this form, it may be desirable to reconvert the information to its original form; or it may be desirable to change such information from one time base to another. Also pulse time and pulse position intelligence is readily adaptable for automatic graphical representation of the contained information.

Pursuant to the present invention, a relatively simple arrangement having a high degree of accuracy is provided for the conversion of binary coded numbers to pulse time or pulse position intelligence. For each of the digits in the code, a dual control grid tube is used. All of these dual control grid tubes are connected in parallel across a comparator circuit. The comparator circuit is so biased that only when current flow in all of the dual control grid tubes has stopped is an output pulse effected. A register circuit for each of the digits in the code is arranged to bias a control grid of the dual control grid tube corresponding to the same digit. The connection is so arranged that a binary number registered in the register circuits will cause a bias on the corresponding control grids so as to start current flow in the tubes in accordance with the complement of the number in the register. In one embodiment of the invention, the other control grid of each of the dual control grid tubes is connected to conventional counting circuits which count pulses from a pulse source and continuously bias the corresponding control grids so as to stop current flow in the dual control grid tubes in accordance with the count at any given moment. Thus, when the count in the counters equals the number registered in the registers, all of the dual control grid tubes will, for the first time, have ceased conducting thereby causing the comparator circuit to emit a pulse. Other pulses may occur thereafter, but are removed by a blocking oscillator in the output circuit. An arrangement is provided for starting the count in the counting circuit at a known interval, as by a synchronizing pulse. Thus, the interval between the synchronizing pulse and the output pulse is determined by the number in the registers. A circuit is also provided for clearing the registers and resetting the apparatus in preparation for a new cycle.

In a second embodiment of the invention, in place of conventional counting circuits, a delay line tapped at suitable intervals replaces some of the counting circuits. This embodiment thereby becomes particularly adaptable to higher counting frequencies than would normally be used in conventional counting circuits.

These and other features, processes and objects will become more apparent from the following description taken in connection with the accompanying drawings, wherein.

Figure 1:
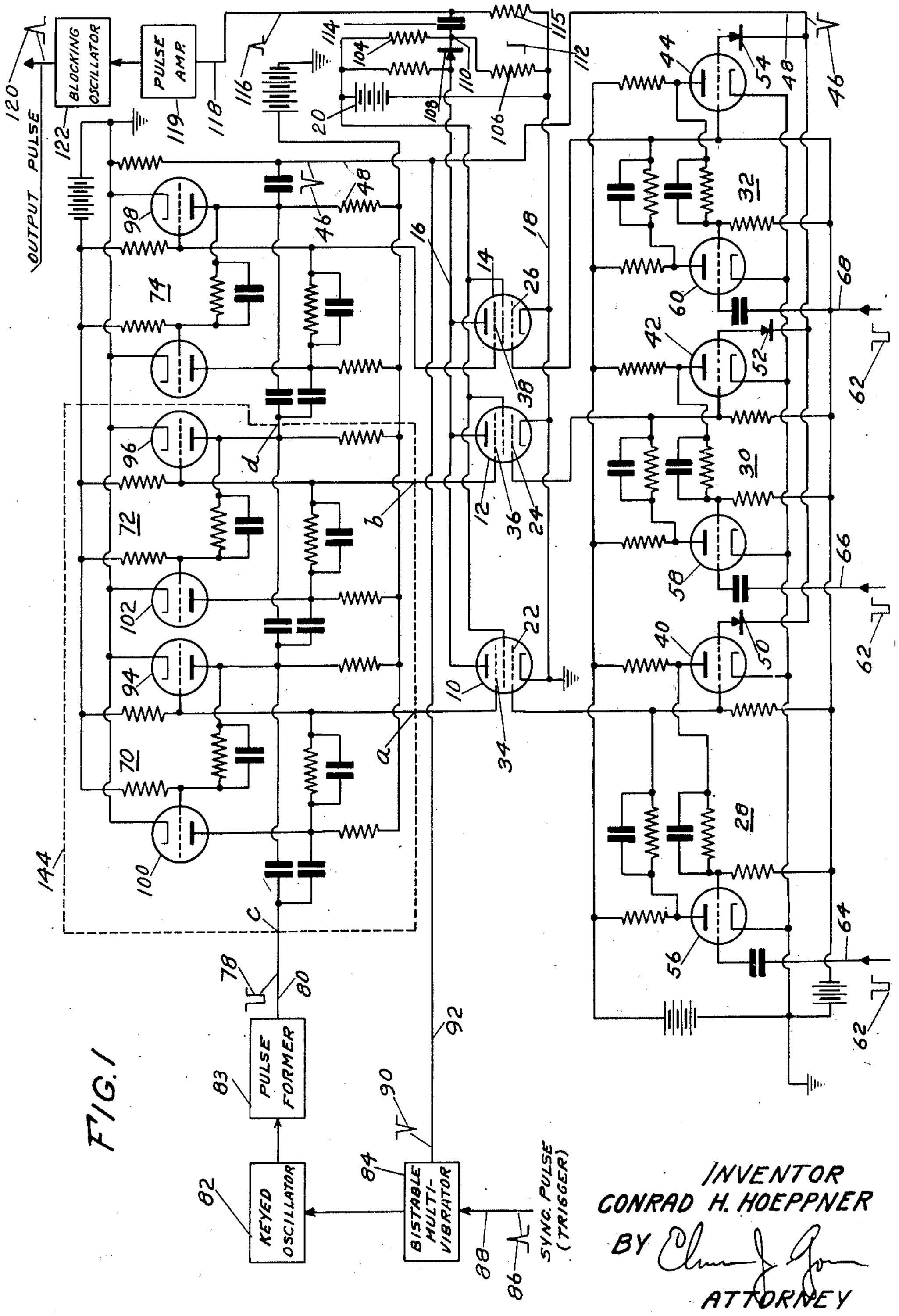
Fig. 1 is a schematic view of one embodiment of the invention.

Referring to Fig. 1 in more detail, dual control grid tubes 10, 12 and 14, which may be vacuum tubes of the 6AS6 type, have their respective anodes connected to line 16 and their cathodes connected to line 18. A suitable potential is maintained across lines 16 and 18, as by a battery 20. Control grids 22, 24 and 26 of tubes 10, 12 and 14, respectively, are connected to binary number registering circuits. In this instance, the registering circuits are suitable bistable multivibrator circuits 28, 30 and 32, each of which, as will be hereinafter explained, may be made to register a digit of a binary code number and impress the complement of this code number on the corresponding control grid of the dual control grid tubes. For purposes of explanation, each of the tubes 10, 12 and 14 represents a digit in the code and is represented by a 0 if it conducting, and is represented by a 1 if it is not conducting. In this manner, binary code numbers may be represented by making certain of the dual control grid tubes conductive and nonconductive as follows:

| tube | 10 | 12 | 14 | |
|---|---|---|---|---|
| code representation | 0 | 0 | 0 | — 0 (number) |
| | 1 | 0 | 0 | — 1 |
| | 0 | 1 | 0 | — 2 |
| | 1 | 1 | 0 | — 3 |
| | 0 | 0 | 1 | — 4 |
| | 1 | 0 | 1 | — 5 |
| | 0 | 1 | 1 | — 6 |
| | 1 | 1 | 1 | — 7 |

Note that the numbers in this instance read from right to left because of the placement of the tubes 10, 12 and 14; that is, the number one is represented by 100 in the present embodiment. If desired, it could be represented by 0 0 1 or even 0 1 0, as by changing the position of the tubes 10, 12 and 14. The result, however, will be the same provided the representation is known and consistently followed.

Assuming that the potential at the other set of control grids 34, 36 and 38 is at a proper level for permitting conduction in the tubes 10, 12 and 14, current flow may be completely controlled by the control grids 22, 24 and 26. Control grids 22, 24 and 26 are connected to the control grids of electron tubes 40, 42 and 44 of the bistable multivibrator circuits 28, 30 and 32, respectively. When the tubes 40, 42 and 44 are nonconductive, the tubes 10, 12 and 14 will also be held nonconductive. When the tubes 40, 42 and 44 are conductive, the corresponding control grids 22, 24 and 26 will have a potential suitable for making the tubes 10, 12 and 14 conductive. Initially a negative triggering pulse 46, from a source to be hereinafter described, is made to appear in line 48 which is connected through unidirectional current devices 50, 52 and 54, such as crystals or diodes, to the grids of the tubes 40, 42 and 44, respectively. The pulse 46 triggers the bistable multivibrators 28, 30 and 32 so as to clear them of any number they might be registering and so as to reset them to a zero condition. In this instance, the zero condition is when no current flows in tubes 40, 42 and 44. Thus, also initially, no current will flow in the tubes 10, 12 and 14. The circuits 28, 30 and 32 being bistable multivibrator circuits, when any of tubes 40, 42 and 44 become nonconductive, those of the tubes 56, 58 and 60 become conductive which are in the corresponding multivibrator circuit; and inversely when any of tubes 56, 58 and 60 become nonconductive, those of tubes 40, 42 and 44 in the same multivibrator circuits become conductive. Initially, because of triggering pulse 46, all of the tubes 56, 58 and 60 are conductive. Any of tubes 56, 58 and 60 may be made nonconductive by inserting a negative trigger pulse 62 in those of lines 64, 66 or 68 running to the corresponding grid of these tubes. For example, if negative pulse 62 is made to appear in line 64, the tube 56 is thereby triggered to become nonconductive. This will cause a rise in potential at the anode of tube 56 which thereby raises the potential in the grid of tube 40 so as to cause conduction in tube 40. Conduction in tube 40 causes a drop in potential at its anode which reduces the grid potential of tube 56. The result is that tube 56 thereby remains nonconductive and tube 40 remains conductive; and as explained, the grid 22 of tube 10 is at a proper potential for causing conduction in tube 10 when tube 40 is conducting.

Using the above table of binary code numbers in the present embodiment, the number three may be registered in the multivibrator circuits 28, 30 and 32 by producing a pulse 62 in the lines 64 and 66. These pulses, as explained above, will cause tubes 40 and 42 to become conductive and will produce a positive bias on control grids 22 and 24 so as to permit current flow in dual control grid tubes 10 and 12. Only tube 14 will remain nonconductive. The above explained numbering picture at dual control grid tubes 10, 12 and 14 may be represented by 0 0 1 which is seen to be not the code number for three shown in the table above, but rather the complement of the number three. By complement is meant that those tubes which would normally be conductive to represent a number are nonconductive, and those tubes which would be normally nonconductive to represent the same number become conductive. The multivibrator circuits 28, 30 and 32, being of the bistable type, will maintain this complement picture at tubes 10, 12 and 14 indefinitely, or until cleared by pulse 46.

The control grids 34, 36 and 38 of the dual control grid tubes 10, 12 and 14 are connected to binary counting circuits 70, 72 and 76 which are, in the present embodiment, again bistable multivibrators connected together in conventional manner to count pulses 78 in line 80 from an oscillator 82 and pulse former 83. The oscillator 82 is, in this instance, controlled by another bistable multivibrator 84 so that when a synchronizing pulse 86 occurs in line 88, the bistable multivibrator 84 is made to cause the oscillator 82 to generate a fixed frequency signal which is formed into pulses 78 by the pulse former 84. When a pulse 90 occurs in line 92 from a source to be hereinafter described, it causes the bistable multivibrator to stop the generation of pulses 78 in line 80. The multivibrator circuits 70, 72 and 76 are connected to the control grids 34, 36 and 38, respectively, in a manner similar to that explained with regard to the registering circuits 28, 30 and 32. Thus, when the tubes 94, 96 and 98 are conducting, control grids 34, 36 and 38, respectively, will have a proper potential for permitting conduction in the dual control grid tubes 10, 12 and 14, respectively. Assuming triggering pulse 90 occurs at a time when tubes 94, 96 and 98 are conducting, the oscillator 82 thereby having been stopped, no further pulses 78 will appear in line 80. The circuits 70, 72 and 74 being bistable multivibrators, the tubes 94, 96 and 98 will remain conducting, and therefore the grids 34, 36 and 38 will be at a proper potential for permitting conduction in tubes 10, 12 and 14 as the zero counting condition of the counter circuits 70, 72 and 74.

Figure 2:
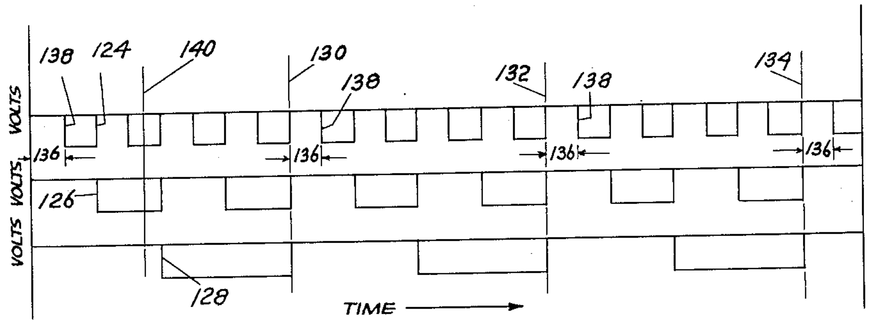
Fig. 2 shows the potential picture at the dual control grid tubes due to the counting circuits.

For purposes of illustration, let us assume the number three is registered in the register circuits 28, 30 and 32, as explained above. The dual control grid tubes 10 and 12 become conductive and only the tube 14 is nonconductive. Counting pulses 78 started by a synchronizing pulse 86 will occur in line 80. The first counting pulse 78 will extinguish tube 94 and thereby cause tube 100 in the multivibrator circuit 70 to become conductive. The drop in potential at the anode of the tube 100 will extinguish the tube 10. The second counting pulse will extinguish tube 100 and again start conduction in tube 94. The resultant drop in potential at the anode of tube 94 triggers the grid of tube 96 in the multivibrator 72 so as to stop conduction in tube 96 and cause tube 102 to conduct. Thus, at the second pulse, tube 12 becomes nonconductive and tube 10 again becomes conductive and tube 14 remains nonconductive. The third counting pulse 78 coming through line 80 triggers the grid of tube 94 to cause it to become nonconductive and tube 102 remains conductive. On this third count, it is noted that tubes 94 and 96 are nonconductive and therefore dual control grid tubes 10 and 12 are both nonconductive. Thus, at that instant, for the first time, all three of the dual control grid tubes 10, 12 and 14 become nonconductive. A potential rise thereby occurs between lines 16 and 18 which exceeds a bias from voltage divider resistances 104 and 106 at a comparator device 108, such as a diode, which thereby starts conducting and causes a sharp rise in potential at the point 110 shown by curve 112. This rise in potential, due to the capacitor 114 and resistances 106 and 115, appears as a pulse 116 in line 118. Pulse 116 is amplified by a pulse amplifier 119 and appears as output pulse 120 from the blocking oscillator 122. Further counting pulses 78 occurring in line 80 may thereafter cause additional pulses in line 118. However, they wil not appear in the output because the blocking oscillator 122 is designed with a sufficiently long time delay to cover subsequent pulses which may appear before the circuits are again reset for another number in the register circuits for a succeeding cycle. In the present embodiment, the pulses 78 will continue to appear in line 80 and be counted in the counting circuits 70, 72 and 74 until the last tube 98 in the counting circuit causes a pulse 46 to appear in line 48, which appears in line 92 as pulse 90, and triggers the multivibrator 84 so as to stop further pulses 78 from being generated in line 80. Also, as explained above, the pulse 46 in line 48 resets the register circuits 28, 30 and 32. The circuits are then in condition for the start of a new cycle similar to that explained above. It should be noted that the last tube 98 will produce the pulse 46 when the potential at its anode drops. This will occur when the tube 98 becomes conductive and represents a count of one number higher than the maximum possible count in the counting circuits. In the present embodiment of three digits, the pulse 46 would occur at the count of eight. Upon reaching this count, all of the tubes 94, 96 and 98 become conductive and represent a zero condition in the counters. Thus, when the count reaches this zero condition, the pulses 78 cease to appear in line 80 and the counter remains at zero until a new cycle is initiated, as explained above. This cyclic picture at the dual control grid tubes may be seen in Fig. 2. The potential picture at grids 34, 36 and 38 due to the counting circuits 70, 72 and 74 are shown by curves 124, 126 and 128, respectively. Three cycles are represented, the first ending at the line 130, the second at 132, and the third at 134. The time interval 136 represents the standby zero condition and may, or may not, be of equal duration after each cycle, depending on the timing of synchronizing pulse 86. The timing interval starts at 138 in each cycle. The potential at the grids 34, 36 and 38 for a count of three in the first cycle may be seen at the line 140.

Since the pulse 120 represents the condition when the count in the counters 70, 72 and 74 first reaches the binary number registered in the register circuits 28, 30 and 32, and since any time delay due to the apparatus itself is constant, the interval between the pulses 86 and 120 is proportional to this binary number and provides the intelligence interval. The time base of the interval between the pulses 86 and 120 is provided by the frequency selected for the oscillator 82.

Figure 3:
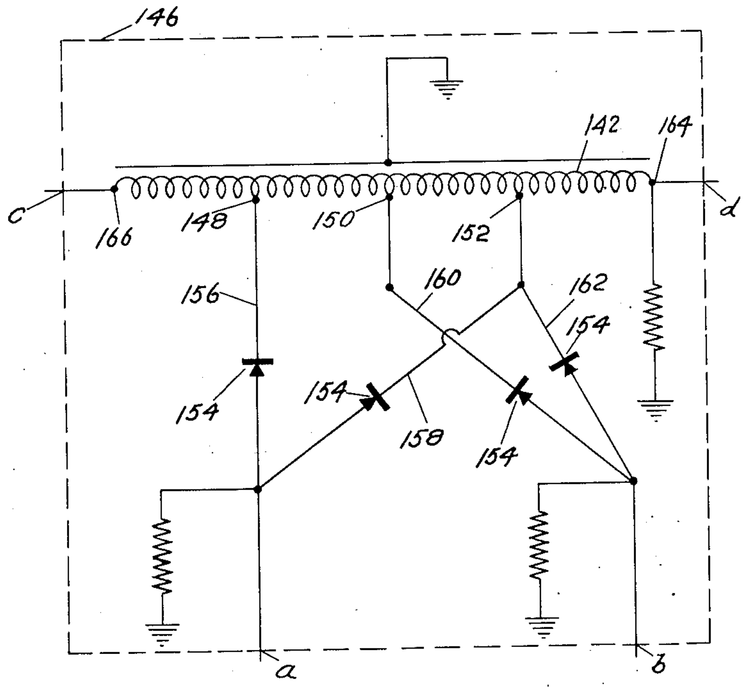
Fig. 3 is a schematic view of a signal delay arrangement which when substituted for a portion of Fig. 1 enclosed in dotted lines provides a second embodiment of the invention.

In some instances, it may, for example, be desired to provide counting frequencies above those capable of being handled by multivibrator counting circuits. For these higher frequencies a delay line 142 in Fig. 3 may be used for the more rapidly changing digits of the code in place of the conventional counting circuits. For example, in this instance, the delay line 142 is substituted for the counting circuits 70 and 72. This is performed by replacing the portion shown in the dotted lines 144 in Fig. 1 by that shown in dotted lines 146 in Fig. 3. Points 148, 150 and 152, preferably dividing delay line 142 into four equal time interval segments, are connected through points $a$ and $b$ to control grids 34 and 36, as shown. Unidirectional current devices 154, such as crystals or diodes, are inserted in the lines 156, 158, 160 and 162 to prevent short circuiting. The delay line 142 is connected to line 80 at the point $c$ and to the counting circuit 74 at the point $d$. Pulse 78 passing through delay line 142 wil create a negative pulse at grid 34 when it reaches the point 148. The negative pulse at grid 34 represents the count of one as shown on the code table above. When it reaches the point 150, it creates a negative pulse at grid 36 which represents the count of two. When it reaches the point 152, it creates negative pulses at both grids 34 and 36 which represents a count of three. The delay line 142 preferably has a time interval such that when the pulse 78 reaches the points 164 to trigger the counting circuit 74 for the count of four, another counting pulse 78 is just entering the delay line at point 166. Thus, the potential picture at grids 34, 36 and 38 may still be represented by Fig. 2. It is seen that the delay line has increased the effective counting pulse rate thereby permitting high counting rates with relatively low frequency oscillators. The remainder of the circuit in the second embodiment will operate, as explained, with regard to the first embodiment.

While in the present embodiments a three digit code is used for purposes of illustration, a larger or smaller number of digits may be used equally well as by adding or removing counting and register circuits with dual control grid tubes for each such digit in a manner similar to that herein shown and described for the three digit systems. Also, the delay line may be substituted for a smaller or larger number of digits than the two digits shown in the present embodiment.

It is intended, therefore, that this invention not be limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A binary system comprising means for producing signal pulses, means for counting said pulses, means for registering a number in binary code, means for comparing the count on said counting means with the number on said registering means, and means for producing a signal pulse when the number on said counting means equals the number on said registering means.

2. A binary system comprising means for producing signal pulses, means for counting said pulses, means for registering a number in binary code, means for comparing the count on said counting means with a complement of the number on said registering means, and means for producing a signal pulse when the number on said counting means equals the number on said registering means.

3. A binary digital system comprising normally nonconductive means for each of the digits in said binary system, means for making those of said conductive means representing the complement of a selected number conductive, means for producing signal pulses, means for making those of said conductive means representing the count of said signal pulses nonconductive, and means responsive to the extinguishing of all of said conductive means for causing an output signal pulse.

4. A binary digital system comprising normally nonconductive means for each of the digits in said binary system, means for making those of said nonconductive means representing the complement of a selected number conductive, means for producing fixed frequency signal pulses, means for making those of said conductive means representing the count of said signal pulses nonconductive, and means responsive to the extinguishing of all of said conductive means for causing an output signal pulse.

5. A binary digital system comprising normally nonconductive means for each of the digits in said binary system, means for making those of said nonconductive means representing the complement of a selected number nonconductive, means for producing fixed frequency signal pulses, signal delay means for making those of said conductive means representing the count of said signal pulses conductive, and means responsive to the extinguishing of all of said conductive means for causing an output signal pulse.

6. A binary system comprising means for producing signal pulses, means for counting said pulses, means for registering a number in binary code, and means for comparing the count on said counting means with a complement of the number on said registering means.

7. A binary system comprising means for registering a number in binary code, means for producing signal pulses, means for counting said pulses, said counting means including signal delay means for the more rapidly changing digits in said counting means, means responsive to a synchronizing pulse for starting the counting of said signal pulses, means for comparing the count on said counting means with the number on said registering means, and means for producing an output signal pulse when the number on said counting means equals the number on said registering means.

8. A system as in claim 7 having additionally means for resetting said counting and said registering means after said output signal pulse.

9. A system as in claim 7 having additionally means for resetting said counting and said registering means after said output signal pulse and means for preventing more than one output signal pulse in any one cycle of said system.

10. In a binary digital system, dual control means for each of the digits in said code, means for impressing upon one control of said dual control means the complement of a binary code number, means for impressing upon the other control of said dual control means said binary code number, and means responsive to the simultaneous existence of said complement and said code number on said control means for producing a signal.

CONRAD H. HOEPPNER.

REFERENCES CITED

The following references are of record in the file of this patent:

UNITED STATES PATENTS

| Number | Name | Date |
|---|---|---|
| 2,407,320 | Miller | Sept. 10, 1946 |